March 7, 1967 R. S. DETRICK 3,307,997
METHOD AND APPARATUS FOR ADHESIVELY JOINING TOGETHER
CONTIGUOUS THERMOSETTING RESIN IMPREGNATED
FILAMENT REINFORCED MEMBERS
Filed March 9, 1966
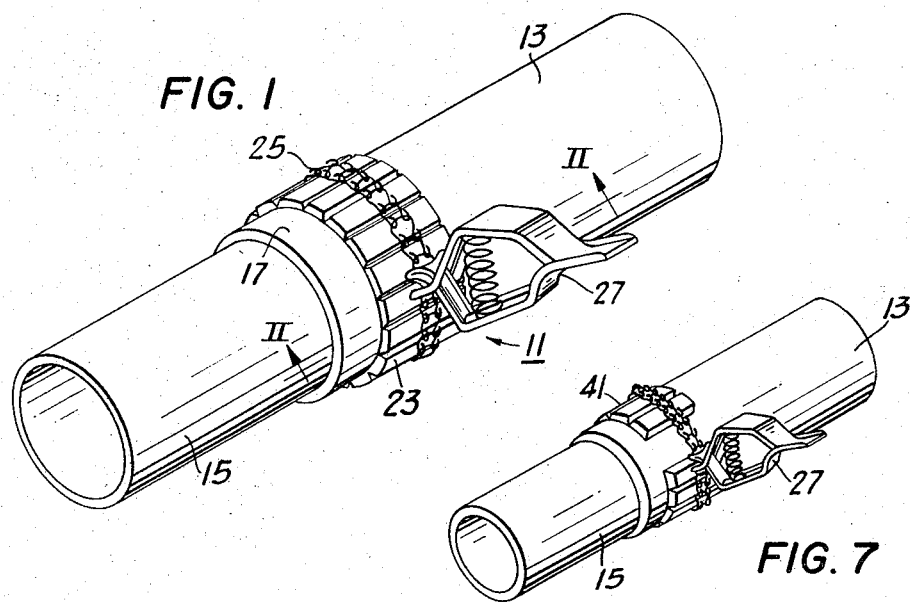
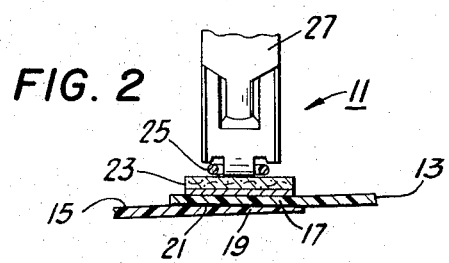
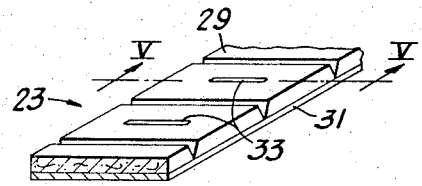
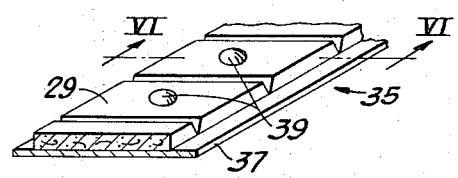
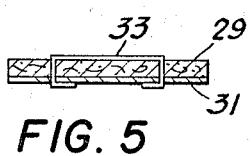
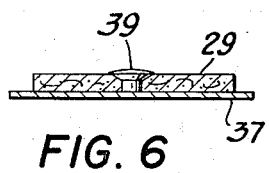
INVENTOR.
R. SHERMAN DETRICK
BY Sherman H Barber
his Attorney United States Patent Office 3,307,997
Patented Mar. 7, 1967

3,307,997
METHOD AND APPARATUS FOR ADHESIVELY JOINING TOGETHER CONTIGUOUS THERMO- SETTING RESIN IMPREGNATED FILAMENT RE- INFORCED MEMBERS
Robert Sherman Detrick, Bethel Park, Pa., assignor to Koppers Company, Inc., a corporation of Delaware
Filed Mar. 9, 1966, Ser. No. 533,088
5 Claims. (Cl. 156—294)

This invention relates to an improved method and apparatus for joining together resin impregnated fiber glass articles and in particular tubular fiber glass articles.

The joining together of resin impregnated fiber glass pipe and fittings in the conventional manner, using an adhesive, results frequently in leaky joints that are unsatisfactory. A principal cause of the leaky joints is improper curing of the adhesive applied to the articles to make the joint. Normally, an adhesive joint between fiber glass members requires a curing time in days, but in many applications such as long curing time is unacceptable. Usually, it is desirable and necessary to shorten this curing time, and it has been customary to apply heat to the joint to accelerate the curing process but if the heat is not properly applied, the curing may be improper. If, for example, insufficient heat, or no heat at all, is applied, the adhesive sets too slowly. The joint may still be flexible to a certain degree, and any movement of the joined members can so disturb the adhesive that it will not satisfactorily bond to both members. On the other hand, if the joint is overheated, the adhesive will become brittle and the pipe itself may be damaged or even charred. In either case, where there is improper curing of the adhesive, weak or leaky joints can and usually do occur.

It is particularly difficult to make a suitable joint in the field between fiber glass pipe and fittings, and between lengths of fiber glass pipe because the piping system is subject to some movement while it is being made up. The joints are easily disturbed after being made up and in cold weather not enough ambient heat is supplied to the joint to raise the temperature of the adhesive to a proper curing temperature. It is particularly difficult to uniformly apply heat to a field joint using such common heat energy sources as gasoline, bottled gas, solid fuel, and the like. Then, too, transportation and storage problems are magnified when such fuels are the only ones available for use.

In contrast to the foregoing in the method of adhesively joining together fiber glass articles, in accordance with the present invention, a flexible fuel element of combustible solid material is conformed and removably secured to the outer surface of one of the contiguously joined fiber glass members in such a manner that the fuel element is disposed over the adhesive material on the joint surface; the fuel material is ignited, whereupon it burns in a uniformly progressive manner and the heat that is generated penetrates the fiber glass member and raises the temperature of the adhesive between the members to accelerate the curing time of the adhesive.

In accordance with the invention, the fuel element comprises a thin metal band that is adapted to conform to and lie contiguously on one fiber glass article, over an adhesive joint between two fiber glass articles, and a fuel board suitably secured to the metal band. In service, the fuel board is ignited and burns progressively and the heat generated thereby is conducted to the adhesive so that the temperature of the adhesive is raised and the curing time of the adhesive is accelerated.

For a further understanding of the present invention and for advantages and features thereof, reference may be made to the following description taken in conjunction with the accompanying drawing which shows, for the purpose of exemplification, embodiments of the invention.

In the drawing:

FIG. 1 is a schematic perspective view of one form of apparatus suitable for practicing the method of the invention;

FIG. 2 is a sectional view along line II—II of FIG. 1;

FIG. 3 is a schematic perspective view of one embodiment of a fuel element;

FIG. 4 is a schematic perspective of an embodiment of another fuel element;

FIG. 5 is a sectional view along line V—V of FIG. 3;

FIG. 6 is a sectional view along line VI—VI of FIG. 4; and

FIG. 7 is a schematic perspective view of another form of apparatus suitable for practicing the method of the invention.

FIG. 1 illustrates two lengths of fiber glass pipe 13, 15 assembled together in the bell and spigot manner in association with an embodiment 11 of the invention which comprises a fuel element 23 that conforms to the shape of pipe 13 and a restraining device 25, 27 to maintain the fuel element 23 in place. The pipe length 13 has a flared bell-like end 17, and the pipe length 15 has been tapered to form a spigot-line end portion 19 (FIG. 2). Before the bell and spigot ends 15, 17 are mated, as shown in FIG. 1, an adhesive substance 21 is spread upon the tapered spigot-like end portion 19, and thereafter the spigot-like end portion is inserted into the bell-like end 17.

Around the outer periphery of the bell-like end portion 17, in accordance with this invention, there is wrapped a length of flexible fuel element 23. The fuel element 23 (described hereinafter) is secured in place over the adhesively covered joint in a location preferably near the thinner end of the pipe 15. In the embodiment of FIG. 1, a length of chain 25 is wrapped around the fuel element 23, and an alligator-type of clamp 27 engages the chain in a manner to maintain the fuel element in proper location relative to the adhesive joint and in good contact with the outer surface of the pipe 13.

One embodiment of the fuel element 23 of the invention is illustrated in FIGS. 3 and 5. It comprises a combustible fuel board 29 that is affixed to a thin metal band 31 by means of a plurality of spaced apart wire staples 33 (FIG. 5).

The fuel board 29 is a laminar structure of dry combustible material that generates considerable exothermic heat upon combustion. The heat energy source is a self-oxygenating type of fuel within the fuel board, that is quick burning at the surface, and that burns substantially flamelessly at a constant rate. Such fuel boards are commercially available from several manufacturers, for example from W. D. Eagan Manufacturing Company, Muskogee, Oklahoma, and Shaler Company, Waupun, Wisconsin.

The metal band 31 may be steel, tin, aluminum, or any other suitable material. The band, however, should be thin enough to readily conform to the contour of the fiber glass article to which the fuel element 23 is applied. The metal band 31 serves several purposes such as: providing a flexible support or carrier for the fuel board 29; providing an excellent conductor of heat from the fuel board to the surface of the fiber glass article; and preventing the ignited fuel board from burning or charring the surface of the fiber glass article.

In the embodiment of the fuel element 23 shown in FIG. 3, the metal band 31 and fuel board 29 are substantially the same width. In the embodiment of the invention illustrated in FIG. 4, the fuel board is typically about one inch in width and about 3/32" in thickness, and the metal band is typically one and one quarter inches in width and about 38 gauge in thickness; the fuel board being centered preferably on the wider metal band.

In the embodiment of the fuel element 35 shown in FIG. 4, the fuel board 29 is applied to a metal band 37 that is, in this embodiment of the invention, slightly wider than the fuel board 29.

The means to secure the fuel board 29 to the metal band 37 may be wire staples 33 as illustrated in FIG. 5, or a rivet 39 that passes through the fuel board and may be spot welded to the metal band 37, as illustrated in FIG. 6. Of course, other suitable means may be employed to secure the fuel board to the metal band if preferred.

To render the fuel element 23 to conform to the surface contour of a particular fiber glass article, especially when it is desired to wrap a fuel element around the bell-like end portion of a pipe of small size, it may be desirable to score the fuel board 29 in a transverse direction (FIGS. 1, 3 and 4) so that the fuel elements 23, 35 can make good contact with the fiber glass article without causing the laminar fuel board to crack and separate. In some applications, the fuel board may be scored lengthwise or both lengthwise and transversely to achieve the same desirable result.

Other methods, of course, may be employed to make the fuel element 23 such as, for example, cementing the fuel element to the metal band, or partially encapsulating the fuel element in the metal band leaving only a portion of the top surface exposed. In some other applications, it may not be necessary to employ a metal band to carry the fuel board. In such instances, the heat energy source may take the form of a fuel impregnated flexible "rope," similar to rope packing which will, of course, be wide enough and flexible enough to readily conform to the surface of the article to which it is applied.

In a typical application of the invention one end of pipe 15 (FIG. 2) is scarfed or tapered to thereby form a spigot-like end that will contiguously mate with an already prepared bell-like end or flared end on pipe 13. It may also be desirable to dress the outer surface of the bell end 17. Thereafter, the adhesive 21, which for purposes of illustration may be a mixture of an epoxy resin (such as is sold under the trade name Araldite 6005) and a modified amine (such as is sold under the trade name ERL–2793), is applied to the spigot-like end surface 19, and pipe 15 is mated with pipe 13 as shown. A fuel element 23 is cut approximately to the length of the circumference of the outer surface of the bell-like end portion 17 and the fuel element 23 is wrapped around the bell-like end and held there momentarily until the chain and clamp 25, 27 can be secured over the fuel element 23 (FIG. 1). It is desirable to point out that the fuel element 23 should be so placed that it overlies the adhesive joint 21 and preferably near the tip end of the spigot portion 19. Thereafter, the fuel board is ignited at one or more places, and the fuel board burns progressively since it contains a self-oxygenating fuel. The heat generated by the fuel board is conducted through the metal band, and through the bell-like portion 17 to the adhesive 21 so that the temperature of the adhesive 21 is raised quickly from ambient temperature to the curing temperature. Sufficient heat is generated by the fuel element to maintain the curing temperature for a required period of time to effect a substantial curing of the adhesive.

When the burning of the fuel element ceases, the clamp 27 may be disconnected from the chain 25 and the apparatus removed from the outer surface of the pipe 13. The heat in the joint gradually dissipates but the adhesive has acquired most of its ultimate bond strength. Though the adhesive may not have been completely cured, it has, as indicated above, become sufficiently cured to permit reasonable movement of the lengths of pipe such as would be experienced in making field installations in a piping system.

In an example wherein ⅛ inch thick fiber glass reinforced pipe was coupled, in accordance with this invention, the outer pipe was wrapped with a fuel element wherein the fuel board was 3/32 inch in thickness and the metal band was 0.008 of an inch in thickness. An adhesive of the following composition bonded the pipes together adequately in from five to ten minutes at all positions within a range of 7/32 inch, or closer, to the fuel element:

A part—100 pts.

| | Pts. |
|---|---|
| Epoxy novolak resin | 80 |
| Resorcinol diglycidyl ether | 20 |

B part—15.3 pts.

| | |
|---|---|
| Meta-phenylenediamine | 12.25 |
| Diethylenetriamine | 3.05 |

Within about thirty seconds after igniting the fuel element, the surface of the pipe directly under the fuel element reached a maximum temperature of 170° C.; within about four minutes time after ignition, a point about 1/32 inch below the outer layer reached a maximum temperature of 137° C., and a point at 1/16 inch below the surface reached a maximum temperature of 108° C. in about five minutes after ignition.

A temperature of at least 100° C. is considered necessary for achieving sufficient curing of the adhesive, and yet a temperature above 175° C. could be excessive. This showed also that the temperature of the surface of the pipe remained above 100° C. for about ten minutes, and that the temperature at 1/16 inch below the fuel element remained above 100° C. for about seven minutes.

Thus, for a pipe wall ⅛ of an inch in thickness, such as is conventionally found in pipes in service, the adhesive remains above 100° C. for about three minutes. However, during this time the adhesive will have set well enough to provide adequate joint strength for further handling.

A slightly different apparatus (FIG. 7) may be used to practice the method of the invention in some instances. After the adhesive 21 is applied to the outer surface of the spigot end 19, the pipe 15 is mated with pipe 13. Thereafter, a plurality of short lengths of fuel element 41 (each one being similar to the fuel element 23) may be strategically located around the outer periphery of the pipe 13. For example, three or four lengths of fuel elements 41 may be placed around the periphery of the bell-like end 17 and arranged at geometrically similar locations. The several fuel elements 41 may then be secured in place by the chain 25 and clamp 27 arrangement, as mentioned hereinbefore. Thereafter, each individual length of fuel element 41 is ignited, and the burning fuel boards will produce sufficient heat in each local area to raise the temperature of the adhesive in that particular area to a proper curing temperature. When the burning has ceased, the separate fuel elements, the chain 25 and the clamp 27, may be removed.

In this modification of the method of the invention, the three or four locally cured adhesive zones will provide a sufficiently rigid pipe joint to allow the pipes 13 and 15 to be properly installed, the untreated areas of adhesive will cure under local ambient temperature and atmospheric conditions. This of course presupposes that, prior to complete curing of the adhesive, there will not be any pressure applied to the joint such as would be experienced if the pipes 15, 13 are conveying gas or fluid under pressure conditions.

Those skilled in the art will recognize that the method of the present invention is simple to practice and it may be readily carried out under adverse field conditions as well as under more favorable shop conditions. The apparatus of the invention is simple to use, the fuel elements are safe to handle and do not present a hazard to life and property while being transported, stored and utilized in field and shop environment; and the fuel board in particular is not considered explosive.

When the apparatus and method of the invention are properly carried out, an adhesive joint between lengths of pipe, or between a length of pipe and a fitting can be made very rapidly. The fuel element burns quickly and the heat generated rapidly cures the adhesive to such an extent that there is no appreciable delay in making up pipe joints. This means that there is a significant reduction in the time required to make satisfactory field or shop joints in piping systems employing resin impregnated fiber glass pipe and fittings, over and above the time now required to make a joint using the methods heretofore available.

Although the method and apparatus of the invention has been described herein with a certain degree of particularity, it is understood that the present disclosure has been made only as an example and various modifications and changes may be made within the scope of the invention as defined by the apepnded claims.

I claim:

1. Apparatus for use in adhesively joining together contiguous thermosetting resin impregnated filament reinforced members comprising:
   (a) a thin metallic band adapted to conform to and have one side temporarily secured to the outer surface of one of said members at a location adjacent said adhesive;
   (b) a continuous length of combustible fuel element attached to the other side of said thin metallic band; and
   (c) a chain and clamp for temporarily securing said band with the fuel element attached thereto at said location, whereby said fuel element, when ignited, burns progressively to generate heat that is transmitted through said metallic band and said one member to said adhesive to raise the temperature thereof and accelerate its curing.

2. The invention of claim 1 wherein:
   (a) said fuel element is scored to facilitate its adaptation to the surface upon which it is temporarily secured.

3. The method for adhesively joining together contiguous thermosetting resin impregnated filament reinforced members comprising:
   (a) applying to at least one surface of one of the members a heat curable adhesive;
   (b) placing the adhesive coated surface of one said member in mating surface relation with another said member;
   (c) placing upon the surface of one said member at a location overlying said adhesive a length of combustible fuel element which generally conforms to the contour of said surface;
   (d) temporarily securing in such position said fuel element; and
   (e) igniting said fuel element whereby the same burns progressively and generates heat that is transmitted to said adhesive to accelerate its curing.

4. The method of claim 3 including:
   (a) placing on the surface of one said member a plurality of spaced apart lengths of combustible fuel elements at locations overlying said adhesively coated mating surfaces, each said individual fuel element conforming generally to the contour of said surface at the respective location;
   (b) temporarily securing to said surface each said individual fuel element; and
   (c) igniting each fuel element whereby each burns progressively and generates heat that is transmitted to a portion of said adhesive to accelerate its curing.

5. The invention of claim 4 including:
   (a) scoring each fuel element to facilitate its adaptation to the contour of the surface upon which it is temporarily secured.

References Cited by the Examiner

UNITED STATES PATENTS

| | | | |
|---|---|---|---|
| 934,711 | 9/1909 | Chapman | 228—56 |
| 2,786,264 | 3/1957 | Colombo | 29—401 |
| 2,930,634 | 3/1960 | Merritt | 285—21 |
| 2,961,363 | 11/1960 | Lowes | 156—294 |
| 2,983,639 | 5/1961 | Jageman | 156—82 |
| 3,070,874 | 1/1963 | Davis | 29—157 |
| 3,162,558 | 12/1964 | Bishop et al. | 149—2 |
| 3,163,113 | 12/1964 | Davis et al. | 149—2 X |
| 3,220,630 | 11/1965 | Rogers et al. | 228—56 X |
| 3,235,289 | 2/1966 | Jones | 156—304 X |

EARL M. BERGERT, *Primary Examiner.*

HAROLD ANSHER, *Examiner.*